United States Patent
Li

(10) Patent No.: US 11,204,869 B2
(45) Date of Patent: Dec. 21, 2021

(54) SYSTEM AND METHOD FOR FACILITATING DATA STORAGE WITH LOW-LATENCY INPUT/OUTPUT AND PERSISTENT DATA

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 63 days.

(21) Appl. No.: 16/704,923

(22) Filed: Dec. 5, 2019

(65) Prior Publication Data

US 2021/0173776 A1 Jun. 10, 2021

(51) Int. Cl.
*G06F 12/0804* (2016.01)
*G06F 12/02* (2006.01)
*G06F 12/1009* (2016.01)
*G06F 12/126* (2016.01)

(52) U.S. Cl.
CPC ...... *G06F 12/0804* (2013.01); *G06F 12/0253* (2013.01); *G06F 12/1009* (2013.01); *G06F 12/126* (2013.01); *G06F 2212/1044* (2013.01); *G06F 2212/657* (2013.01)

(58) Field of Classification Search
CPC ............... G06F 12/0804; G06F 12/126; G06F 12/1009; G06F 12/0253; G06F 2212/1044; G06F 2212/657
See application file for complete search history.

(56) References Cited

U.S. PATENT DOCUMENTS

| | | | | |
|---|---|---|---|---|
| 8,756,375 B2 * | 6/2014 | Flynn | G06F 3/0688 | 711/128 |
| 9,519,540 B2 * | 12/2016 | Atkisson | H04L 12/4625 | |
| 10,101,942 B1 * | 10/2018 | Parker | G06F 12/0246 | |
| 2009/0193184 A1 * | 7/2009 | Yu | G11C 11/5678 | 711/103 |
| 2016/0357452 A1 * | 12/2016 | Kadam | G06F 3/0658 | |
| 2017/0315749 A1 * | 11/2017 | Valine | G06F 16/278 | |

\* cited by examiner

*Primary Examiner* — Sean D Rossiter
(74) *Attorney, Agent, or Firm* — Shun Yao; Park, Vaughan, Fleming & Dowler LLP

(57) ABSTRACT

One embodiment provides a system for facilitating data placement. The system receives a sector of data to be written to a first non-volatile memory and a second non-volatile memory, wherein the first non-volatile memory resides on a first storage device which supports sequential writes, and wherein the second non-volatile memory resides on a second storage device. The system writes the sector and its corresponding logical block address to the first non-volatile memory in a sequential manner. The system writes, at approximately a same time, the sector and its corresponding logical block address to the second non-volatile memory. In response to completing the write to the first non-volatile memory or the second non-volatile memory, the system generates an acknowledgment that the sector is successfully committed for a host from which the sector is received.

20 Claims, 8 Drawing Sheets

SYSTEM AND METHOD FOR FACILITATING DATA STORAGE WITH LOW-LATENCY INPUT/OUTPUT AND PERSISTENT DATA

BACKGROUND

Field

This disclosure is generally related to the field of data storage. More specifically, this disclosure is related to a system and method for facilitating data storage with low-latency input/output (I/O) and persistent data.

Related Art

Today, various storage systems are being used to store and access the ever-increasing amount of digital content. A storage system can include storage servers with one or more storage devices, and a storage device can include physical storage media with a non-volatile memory (such as a solid state drive (SSD) or a hard disk drive (HDD)). Non-volatile memory is crucial because it provides persistent storage of data. Furthermore, an I/O request (e.g., a write request) may only be considered complete when the associated data has been written to the persistent storage. The time involved to complete a write request can be referred to as the "write latency." Write latency is a critical factor in many applications, including, e.g., database, cloud drives, big-data analysis, etc. However, significant differences exist between the currently available types of persistent storage, e.g., between the high-speed NAND flash of an SSD and the slower-speed rotating media such as tape or disks of an HDD.

Thus, while many types of persistent storage are available, it remains a challenge to efficiently and effectively utilize the potential of the high-speed NAND. One current solution involves shortening the data path by placing the persistent storage close to the system memory. However, this solution has limitations, including: periodically charging a battery-backed DRAM; relying on vendor-specific central processing units (CPUs) and battery-backed DRAMs; paying a high cost for these vendor specific components; and losing throughput expansion due to a limited number of vendor-specific slots.

SUMMARY

One embodiment provides a system and method for facilitating data placement. During operation, the system receives a sector of data to be written to a first non-volatile memory and a second non-volatile memory, wherein the first non-volatile memory resides on a first storage device which supports sequential writes, and wherein the second non-volatile memory resides on a second storage device. The first storage device can support sequential writes without maintaining a mapping table, and the second storage device can include a volatile cache and maintain a mapping table. The system writes the sector and its corresponding logical block address to the first non-volatile memory in a sequential manner. The system writes, at approximately a same time, the sector and its corresponding logical block address to the second non-volatile memory. In response to completing the write to the first non-volatile memory or the second non-volatile memory, the system generates an acknowledgment that the sector is successfully committed for a host from which the sector is received.

In some embodiments, subsequent to completing the write to the first non-volatile memory, in response to determining that the sector and its corresponding logical block address have been written to the second non-volatile memory, the system generates a notification that the sector and its corresponding logical block address may be overwritten in the first non-volatile memory.

In some embodiments, writing the sector and its corresponding logical block address to the first non-volatile memory comprises: writing the sector and its corresponding logical block address to a first block of a plurality of blocks of the first non-volatile memory, via a first channel of a plurality of channels through which to access the blocks, at a next available physical location of the first block.

In some embodiments, prior to writing the sector and its corresponding logical block address to the first or the second non-volatile memory, the system performs the following operations. In response to determining an insufficient number of free blocks in the first or the second storage device, the system releases redundant blocks to make the redundant blocks available for storing data. In response to determining that a total capacity of a respective storage device is not less than a predetermined watermark, the system sets the first or the second non-volatile memory to a read-only mode. In response to determining that the total capacity of the respective storage device is less than the predetermined watermark, the system writes the sector and its corresponding logical block address to the first or the second non-volatile memory.

In some embodiments, the system determines, by the second storage device, a physical block address of the second non-volatile memory at which to write the sector and its corresponding logical block address. The system stores, by the second storage device in the mapping table, a mapping of the logical block address to the physical block address. The system writes the sector and its corresponding logical block address to the second non-volatile memory by: writing the sector and its corresponding logical block address to a volatile cache of the second storage device; and copying the sector and its corresponding logical block address from the volatile cache to the second non-volatile memory at the physical block address.

In some embodiments, second storage device does not include a power loss protection module. The system receives, by the volatile cache of the second storage device, the sector and its corresponding logical block address. The system writes the sector and its corresponding logical block address to the volatile cache. In response to determining that the sector is an update to data currently stored in the volatile cache, the system replaces the currently stored data in the volatile cache with the updated sector.

In some embodiments, the system accumulates, in the volatile cache, the sector and additional sectors of data to obtain a plurality of sectors. The system classifies each of the plurality of sectors based on a frequency of access of a respective sector. In response to forming a first page of data with sectors of a same classification, the system writes the first page to a first block of the second non-volatile memory.

In some embodiments, in response to detecting a condition which triggers a garbage collection, the system performs the garbage collection on the first page. The system marks the first page as available for storing data.

In some embodiments, a classification for a respective sector, in an ascending order of frequency of access, comprises one or more of hot, warm, and cold.

In some embodiments, in response to detecting an error with a second sector stored in the second non-volatile memory, wherein the second sector is stored with its corresponding second logical block address, the system performs an error recovery by performing the following operations. The system reads out all data stored in the first non-volatile memory to obtain a plurality of bundles of data, wherein a respective bundle comprises a logical block address and its corresponding sector of data. The system scans the read-out data based on the second logical block address to obtain a bundle which comprises the second sector and its corresponding second logical block address. The system uses the second sector from the obtained bundle to perform the error recovery of the second sector stored in the second non-volatile memory.

BRIEF DESCRIPTION OF THE FIGURES

In the figures, like reference numerals refer to the same figure elements.

DETAILED DESCRIPTION

Figure 1:
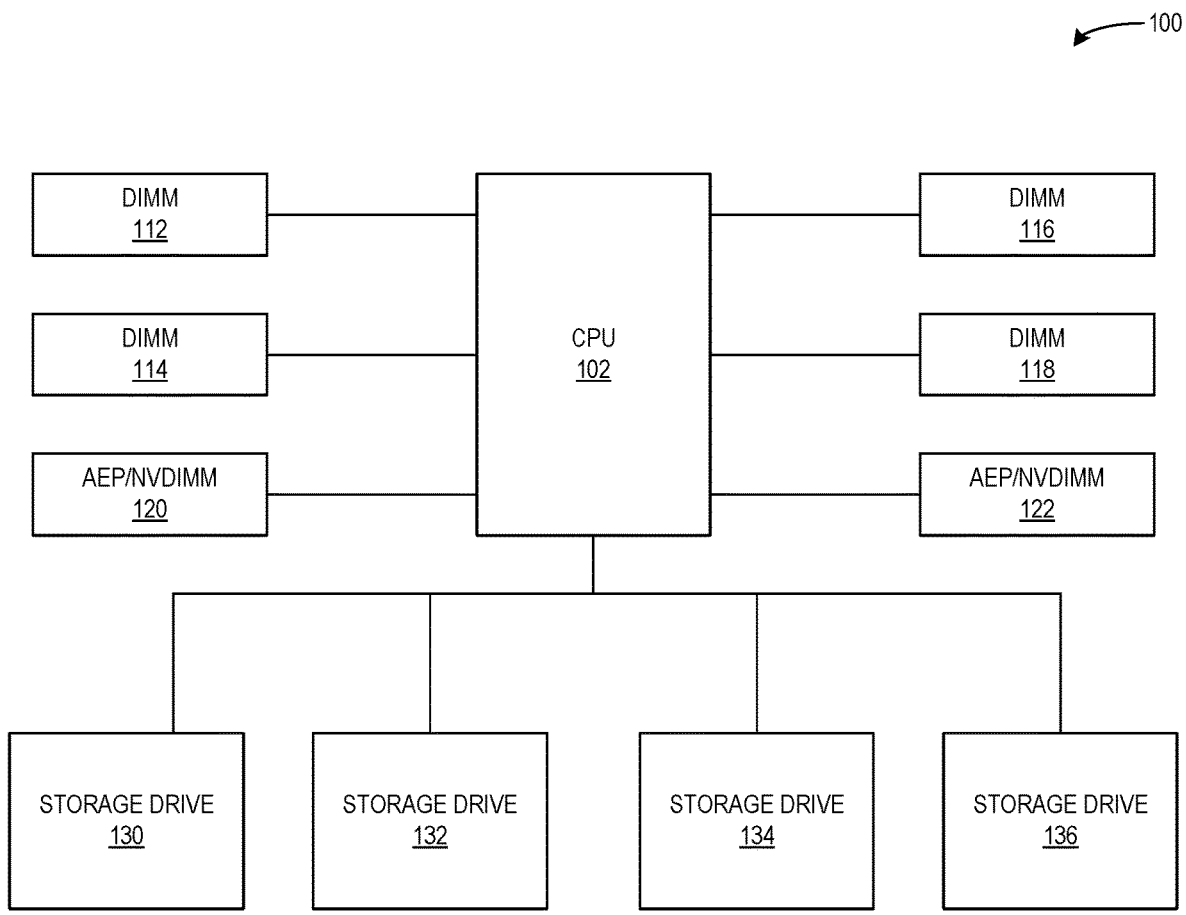
FIG. 1 illustrates an exemplary environment which facilitates data placement, including placing a non-volatile memory close to the system memory, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate an improved system which decreases the write latency and reduces the internal resource consumption of a storage device by writing data to both a persistent buffer of a first storage device and to a non-volatile memory of a second storage device. The persistent buffer can act as a write cache, and the first storage device can be a simplified storage device which supports sequential writes without maintaining a mapping table. The second storage device can include a volatile cache and can maintain a mapping table (e.g., via a flash translation layer module).

As described above, a write request may only be considered complete when the associated data has been written to the persistent storage. The time involved to complete a write request can be referred to as the "write latency." Write latency is a critical factor in many applications, including, e.g., database, cloud drives, big data analysis, etc. However, significant differences exist between the currently available types of persistent storage, e.g., between the high-speed NAND flash of an SSD and the slower-speed rotating media such as tape or disks of an HDD.

Thus, while many types of persistent storage are available, it remains a challenge to efficiently and effectively utilize the potential of the high-speed NAND. One current solution involves shortening the data path by placing the persistent storage close to the system memory. However, this solution has limitations, including: periodically charging a battery-backed DRAM; relying on vendor-specific central processing units (CPUs) and battery-backed DRAMs; paying a high cost for these vendor specific components; and losing throughput expansion due to a limited number of vendor-specific slots. An exemplary current solution is described below in relation to FIG. 1.

The embodiments described herein address these challenges by providing a system in which data is written at approximately the same time to both a first non-volatile memory of a first storage device and to a second non-volatile memory of a second storage device. As described above, the first non-volatile memory can be a persistent buffer, a persistent cache, or a write buffer. The first storage device can be a simplified storage device (such as an SSD) which, by not maintaining a mapping table, can result in a decreased write latency. The first storage device can support sequential writes, such that data is written to a next available location in the persistent buffer of the first storage device. An exemplary data placement in a persistent buffer is described below in relation to FIG. 3.

The second storage device can include a volatile cache, to which the data is initially written, as well as persistent media (such as NAND flash), to which the data is copied or written from the volatile cache. The second storage device can also include an FTL module which maintains a mapping table, e.g., the LBA to PBA mapping. In addition, because the data is stored in the persistent buffer of the first storage drive, the second storage drive does not need to maintain a power loss module, which allows the volatile cache of the second storage device (e.g., the internal DRAM of an SSD) to classify and merge data based on a "hotness" (i.e., a frequency of access). The system can accumulate data of a same classification to fill a page and write that page to the non-volatile memory. This can reduce the frequency of garbage collection and can also decrease the consumption of the internal resources of the second storage device. The movement and classification of data based on hotness in the second storage device is described below in relation to FIG. 4. An exemplary data path for a write operation is described below in relation to FIGS. 2B, 5A, 5B, and 5C.

Thus, by using a persistent buffer with a small capacity to bridge the delay on merging I/O data, the embodiments described herein can provide an enhanced write throughput and persistent storage (via two paths) by removing the power-loss protection requirement in a storage drive. The system can provide further efficiencies in a distributed storage system with multiple storage drives, as each storage drive can use its internal DRAM to perform the classification and merging operations of data prior to writing the data to the non-volatile memory of the second storage drive (e.g., the NAND flash or other persistent media of the SSD). The system can fill pages with similarly classified data, and write those pages to the NAND flash. By placing similarly classified data in the same page, the system can provide a reduction in the frequency of garbage collection due to fewer gaps or holes in data which is to be recycled. These improvements lead to a more efficient usage of the high-speed NAND.

A "distributed storage system" can include multiple storage servers. A "storage server" or a "storage system" refers to a computing device which can include multiple storage devices or storage drives. A "storage device" or a "storage drive" refers to a device or a drive with a non-volatile memory which can provide persistent storage of data, e.g., a solid state drive (SSD) or a hard disk drive (HDD).

The term "hotness" refers to a frequency of access of data. Exemplary of types of hotness can include the following categories or classifications: hot; warm; and cold. The hotness of data can be determined based on a predetermined threshold, time interval, number of times accessed per given period of time, etc.

The term "simplified storage device" refers to a storage device which does not maintain a mapping table.

The terms "persistent buffer," "persistent cache," and "write buffer" are used interchangeably in this disclosure, and refer to a non-volatile memory of a simplified storage device which supports sequential writes without maintaining a mapping table.

Exemplary Data Placement in the Prior Art

As described above, one current solution to using high-speed NAND involves shortening the data path by placing the persistent storage close to the system memory. FIG. 1 illustrates an exemplary environment 100 which facilitates data placement, including placing a non-volatile memory close to the system memory, in accordance with the prior art. Environment 100 can include: a CPU 102; dual in-line memory modules (DIMMs) 112, 114, 116, and 118; Apache Pass (AEP)/non-volatile DIMM (NVDIMMs) 120 and 122; and storage drives 130, 132, 134, and 136. AEP is a type of non-volatile memory based on the 3D-Xpoint material, and NVDIMM is DRAM which is battery-backed in order to ensure data persistency in the event of a power loss.

While the non-volatile components (120 and 122) are placed close to the system memory (DIMMs 112-118), the solution depicted in environment 100 has several limitations. First, the battery-backed DRAM requires periodic changing and discharging. During these periods, the NVDIMM can experience a significant amount of vibration, which can affect the performance and the data reliability of the NVDIMM. Given an infrastructure scenario (or a service level agreement (SLA)) which requires a consistent quality of service (QoS), a system which uses NVDIMM can result in a downgrade in performance, and, in some cases, may also experience a service interrupt.

Second, the AEP non-volatile memory requires the latest vendor-specific CPU in order to function properly (e.g., the latest Intel CPU). Applying this requirement to millions of existing servers is not a feasible solution. Third, the high cost of the AEP/NVDIMM is significant, and not a scalable or cost-effective option. Fourth, the system can lose throughput expansion because of the limited of number of vendor-specific slots. That is, installing the AEP/NVDIMMs in the DIMM slots can limit the number of available slots, which in turn can limit the modularity and flexibility for growing capacity and expanding throughput in a distributed storage system.

Figure 2A:
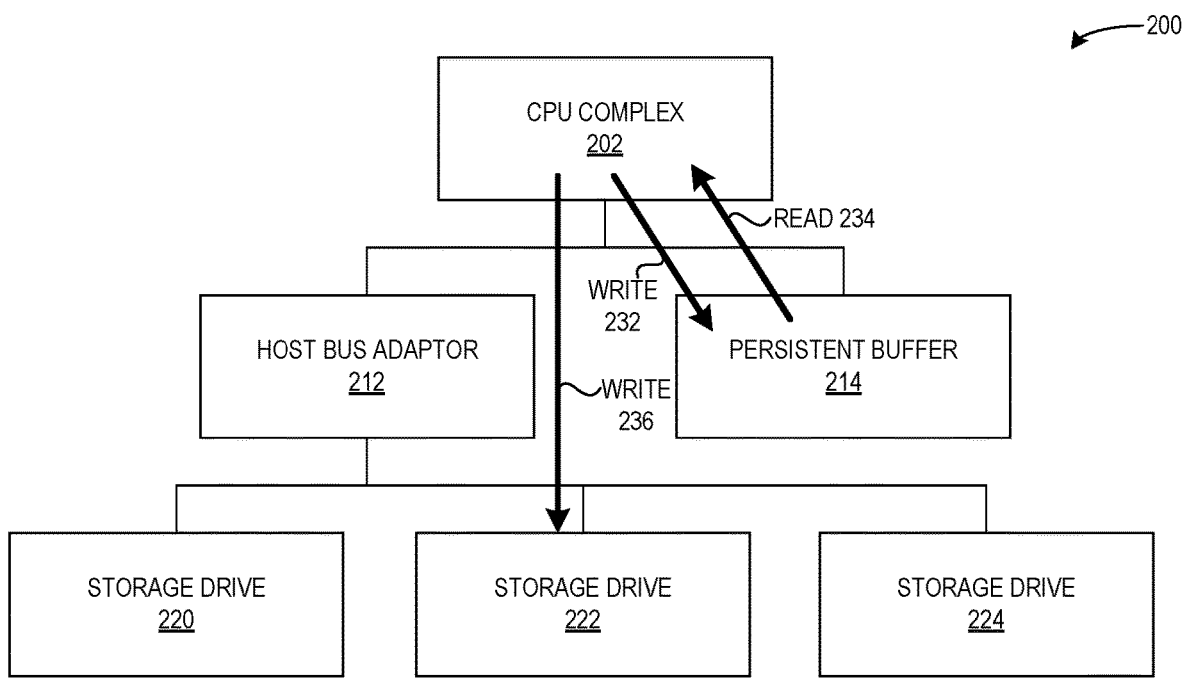
FIG. 2A illustrates an exemplary environment which facilitates data placement, in accordance with the prior art.

Exemplary Environment and Communications for Data Placement: Prior Art vs. One Embodiment FIG. 2A illustrates an exemplary environment 200 which facilitates data placement, in accordance with the prior art. Environment 200 can include: a CPU complex 202; a host bus adaptor (HBA) 212; a persistent buffer 214; and storage drives 220, 222, and 224. During operation, as part of a write operation, CPU complex 202 can send data to be written to persistent buffer 214 (via a write 232 communication). Persistent buffer 214 can reside on a typical SSD, i.e., one with an FTL module which manages and maintains the mapping of logical addresses to physical addresses. Subsequently, in order to write the data to a storage drive, the system must retrieve the stored data from persistent buffer 214 (via a read 234 communication), and subsequently write the retrieved data to a storage drive (via a write 236 communication to, e.g., storage drive 222). These three steps can result in a significant write latency when completing a write request from a host. In addition, mixing the read and write requests on the persistent buffer can affect the performance of the persistent buffer.

In contrast, the embodiments described herein can, at approximately the same time, write data via two separate paths, to a persistent buffer with an expanded throughput which matches the high-speed Internet, and to a storage device with high-speed NAND. The system can write all data which enters the persistent buffer in a sequential manner, which eliminates the issues resulting from mixed read and write requests on the persistent buffer of the prior art system of FIG. 2A. Furthermore, the system can initially write the data to the storage device to a volatile cache and then to persistent media of the storage device, as described below in relation to FIG. 2B.

Figure 2B:
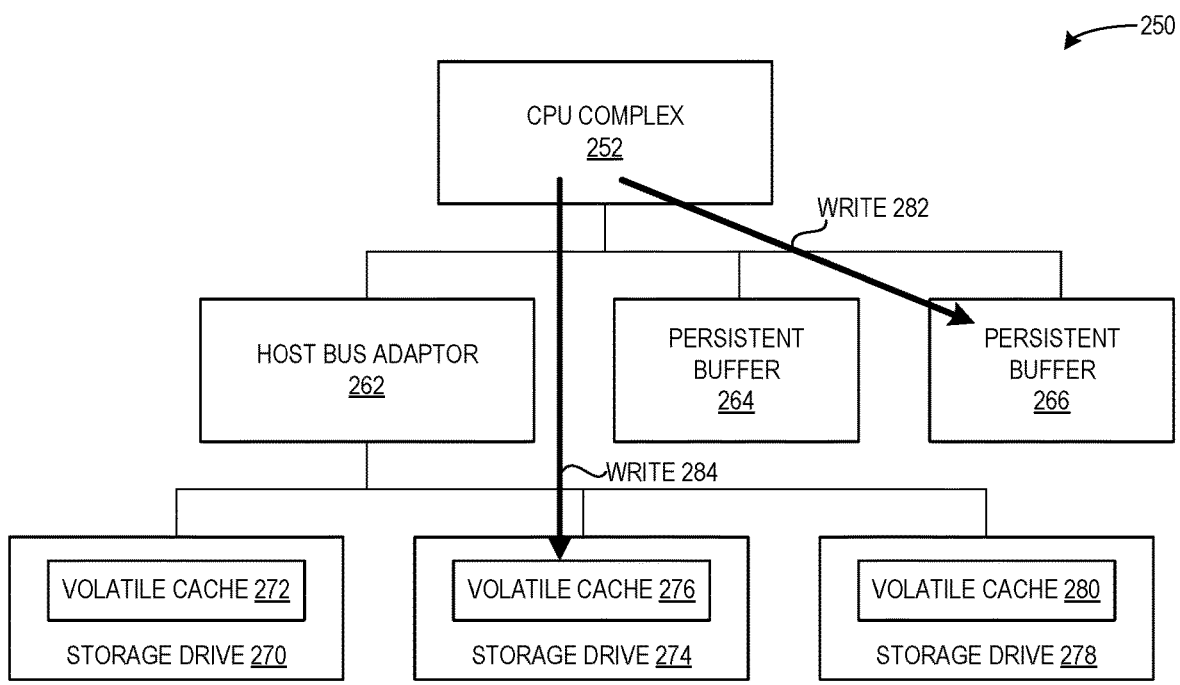
FIG. 2B illustrates an exemplary environment which facilitates data placement, including a first non-volatile memory (as a persistent write buffer in a simplified first storage device) and a second non-volatile memory (in a second storage device which includes a volatile cache and maintains a mapping table), in accordance with an embodiment of the present application.

FIG. 2B illustrates an exemplary environment or apparatus 250 which facilitates data placement, including a first non-volatile memory (as a persistent write buffer in a simplified first storage device) and a second non-volatile memory (in a second storage device which includes a volatile cache and maintains a mapping table), in accordance with an embodiment of the present application. Environment or apparatus 250 can include: a CPU complex 252; a host bus adaptor (HBA) 262; a persistent buffer 264 (e.g., of a simplified storage device); a persistent buffer 266 (e.g., of a simplified storage device); and storage drives 270, 274, and 278. Each storage drive can include a volatile cache (respectively, 272, 276, and 280) as well as non-volatile memory as media for persistent storage (not shown).

During operation, as part of a write operation, CPU complex 252 can receive data to be stored in a non-volatile memory of environment 250. CPU complex 252 can send the data, at approximately the same time, to persistent buffer 266 (via a write 282 communication) and to storage drive 274 (via a write 284 communication). The data can subsequently be successfully written to persistent media in either persistent buffer 266 or in persistent media of storage drive 274 (after being initially written to volatile cache 276 of storage drive 274). The system can generate an acknowledgment that the data has been successfully committed after either being stored in persistent buffer 266 or in storage drive 274 (e.g., in volatile cache 276).

Apparatus 250 can include: a first storage device with a first non-volatile memory (e.g., persistent buffer 264), wherein the first storage device supports sequential writes without maintaining a mapping table; and a second storage device (e.g., storage drive 274) with a second non-volatile memory, wherein the second storage device includes a volatile cache (e.g., volatile cache 276) and maintains a mapping table. Apparatus 250 can be configured to receive a sector of data to be written to the first non-volatile memory and the second non-volatile memory. The first storage device can be configured to write the sector and its corresponding logical block address to the first non-volatile memory in a sequential manner. The second storage device can be configured to write, at approximately a same time, the sector and its corresponding logical block address to the second non-volatile memory. In response to completing the write to the first non-volatile memory or the second non-volatile memory, the apparatus can be configured to generate an acknowledgment that the sector is successfully committed for a host from which the sector is received.

Persistent Write Buffer (of a Simplified First Storage Device)

Figure 3:
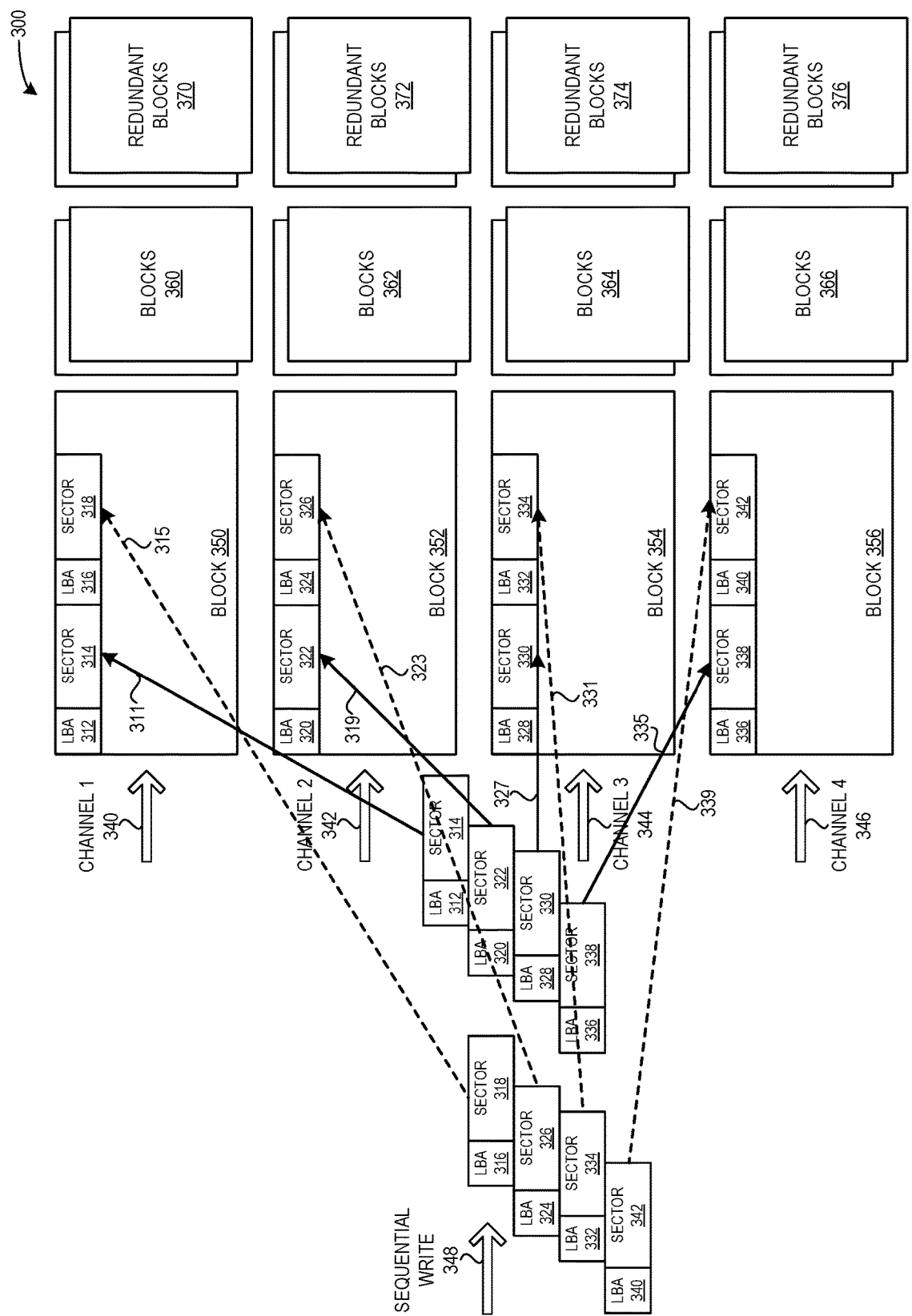
FIG. 3 illustrates an exemplary persistent write buffer of a simplified first storage device, including sequential writes and a data recovery process, in accordance with an embodiment of the present application.

FIG. 3 illustrates an exemplary persistent write buffer 300 of a simplified first storage device, including sequential writes and a data recovery process, in accordance with an embodiment of the present application. During operation, incoming data can be received as sectors, where each sector is written into persistent buffer 300 with its corresponding logical block address appended to the respective sector. In performing a sequential write, the system can receive all incoming data as a series of sector+LBA "bundles," where each bundle is written to a block of a plurality of blocks via a first channel of a plurality of channels, at a next available physical location of a given block. That is, the system can distribute an incoming sequential write across multiple channels in order to improve the throughput of a write operation.

For example, in performing a sequential write 348 operation, the system can receive, in an incoming order, the following bundles: LBA 312+sector 314; LBA 316+sector 318; LBA 320+sector 322; LBA 324+sector 326; LBA 328+sector 330; LBA 332+sector 334; LBA 336+sector 338; and LBA 340+sector 342. The system can write LBA 312+Sector 314 to a block 350 at the next available physical location of block 350 (via a communication 311 through a channel 1 340). Similarly, the system can sequentially write each of the subsequent bundles to the next available physical location of a given block, e.g.: LBA 316+Sector 318 to block 350 (via a communication 315 through channel 1 340); LBA 320+Sector 322 to a block 352 (via a communication 319 through a channel 2 342); LBA 324+Sector 326 to block 352 (via a communication 323 through channel 2 342); LBA 328+Sector 330 to a block 354 (via a communication 327 through a channel 3 344); LBA 332+Sector 334 to block 354 (via a communication 331 through channel 3 344); LBA 336+Sector 338 to a block 356 (via a communication 335 through a channel 4 346); and LBA 340+Sector 342 to block 356 (via a communication 339 through channel 4 346).

In addition to depicted blocks 350-356 which are shown as storing incoming data, persistent buffer 300 can also include blocks 360-366 for storing data. Persistent buffer 300 can also include redundant blocks 370-376, which can be used for overprovisioning, and can be released upon a determination that a nominal capacity or other predetermined watermark or capacity threshold has been exceeded or met. That is, the redundant blocks can be released as a second-tier of capacity while performing a sequential write. Because persistent buffer 300 stores data in a sequential manner, where each sector of data is stored together with its corresponding LBA, a simplified storage device on which persistent buffer 300 resides does not need to maintain a mapping table, e.g., can eliminate the FTL module. This can result in an improved efficiency, as maintenance of a mapping table by a FTL module can consume a significant amount of memory capacity and internal resources.

Thus, the role of persistent buffer 300 is to maintain a persistent copy of each sector. In the event of a write failure, an accident, or other data-related error, the system can recover the data by scanning the content of the persistent buffer for a given LBA. Once the given LBA has been obtained from the scanned content, the system can retrieve the associated data from the write buffer.

Volatile Cache and Non-Volatile Memory (of a Second Storage Device); and Classification of Data Based on Frequency of Access or "Hotness"

Figure 4:
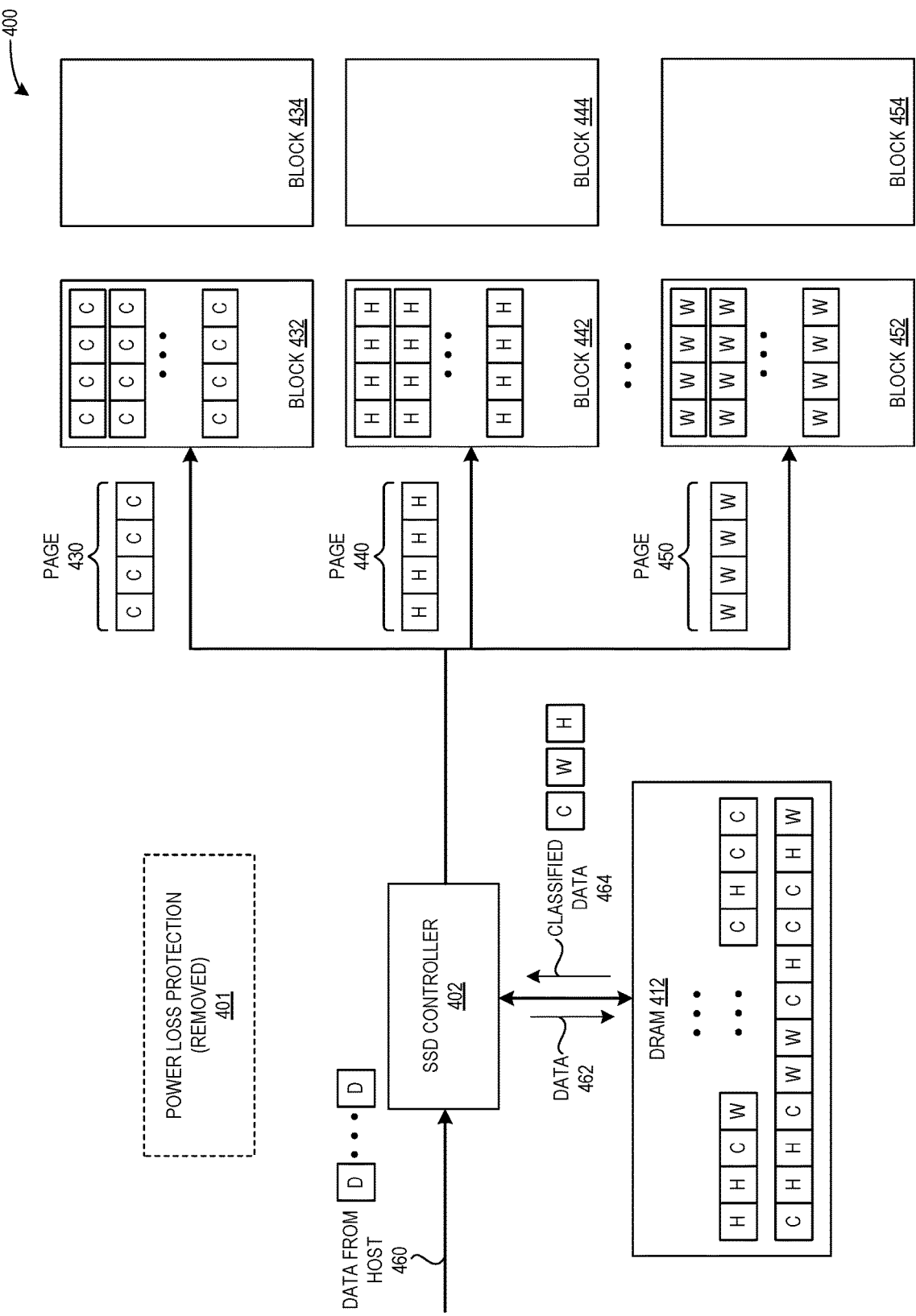
FIG. 4 illustrates an exemplary volatile cache (DRAM) and non-volatile memory (NAND blocks) of a second storage device, including classification based on hotness or frequency of access, in accordance with an embodiment of the present application.

In addition to the simplified persistent write buffer depicted in FIG. 3, the embodiments described herein can further improve throughput and reliability and reduce cost by using a non-battery-backed DRAM. FIG. 4 illustrates an exemplary volatile cache (DRAM) and non-volatile memory (NAND blocks) of a second storage device 400, including classification based on hotness or frequency of access, in accordance with an embodiment of the present application. Storage device 400 can include: an SSD controller 402; a DRAM 412; and persistent media storage depicted as blocks 432, 434, 442, 444, 452, and 454. Because the data can be persistently stored in a persistent buffer (e.g., persistent buffer 300 of FIG. 3), storage device 400 does not needs to include a power loss protection module (indicated by a power loss protection (removed) 401 module, depicted with a dashed-line border). Thus, DRAM 412 can store data for a longer period of time (as compared to a conventional battery-backed DRAM), and can perform operations on the data which improve the throughput of the overall storage system.

During operation, storage device 400 can receive, via SSD controller 402, data from host 460 (depicted as "D, . . . , D"). SSD controller 402 can send the data (as data 462) to DRAM 412, which can take advantage of not requiring a power loss protection module, and can classify the data based on its hotness or a frequency of access, e.g., as "hot," "warm," or "cold." For example, hot data (indicated with an "H") can include data which is accessed at a rate or interval greater than a first predetermined threshold. Cold data (indicated with a "C") can include data which is accessed at a rate or interval less than a second predetermined threshold. Warm data (indicated with a "W") can include data which is accessed at a rate or interval in between the first and the second predetermined thresholds.

DRAM 412 can fill pages with data of a same classification, and write those pages to the persistent media of storage device 400 (i.e., blocks 432, 434, 442, 444, 452, and 454). For example, DRAM 412 can merge and classify the incoming I/O of data 462, fill pages based on hotness, and send classified data 464 (as full pages) to the persistent media for storage. The system can reserve or assign certain blocks of the persistent media to store data of a specific hotness. For example, the system can assign a block 432 for storing cold data, a block 442 for storing hot data, and a block 452 for storing warm data. The system can send a page 430 (which can include data classified as cold data) via a respective channel to be stored in block 432. The system can also send a page 440 (which can include data classified as hot data) via a respective channel to be stored in block 442. The system can also send a page 450 (which can include data classified as warm data) via a respective channel to be stored in block 452.

Thus, by using the persistent buffer of a simplified storage device (as in FIG. 3), the system can eliminate the need for a power loss module in storage device 400, which allows hardware and firmware to be removed from the drive. This reduction in the amount of components and programming required in storage device 400 can result in a significant reduction in the cost. The system can further reduce the expense of testing costs and enhance the reliability of the overall storage system.

Furthermore, as described above, using the persistent buffer (as in FIG. 3) allows the volatile cache (i.e., DRAM 412 of storage device 400) to accumulate and classify data based on its hotness or access frequency, and subsequently write the classified data to a specific physical location which corresponds to the classified data (e.g., hot, warm, cold). Because the corresponding physical blocks hold data of a similar grade of hotness, the system can update and recycle those physical blocks at a similar frequency. More whole pages (and fewer pages with gap/holes which require additional data movement prior to recycling) can thus be recycled at once, which can reduce the internal write amplification and also reduce the amount of bandwidth consumed by performing the internal garbage collection.

Exemplary Methods for Facilitating Data Placement

Figure 5A:
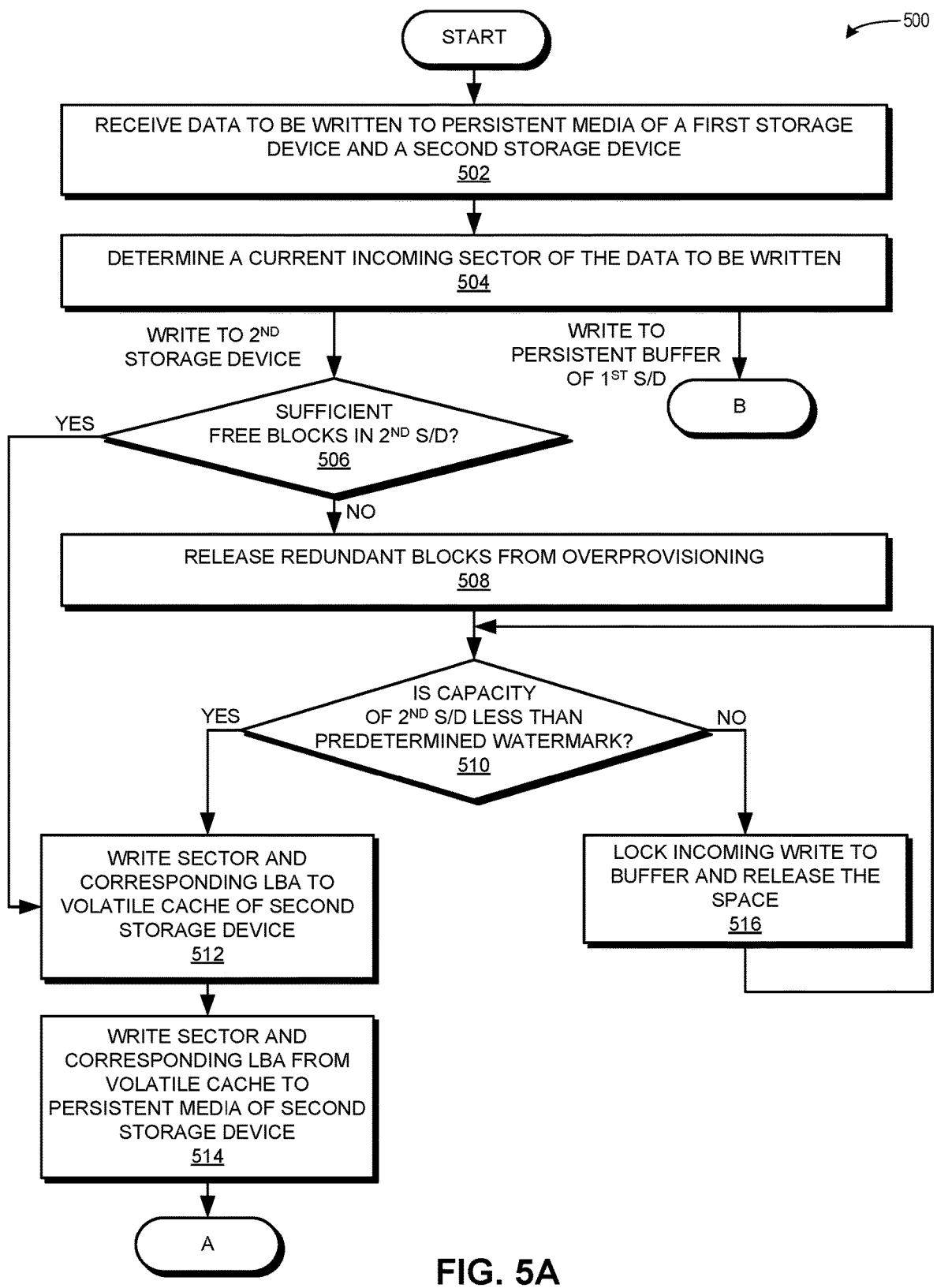
FIG. 5A presents a flowchart illustrating a method for facilitating data placement, including a write operation to a first non-volatile memory (persistent write buffer) of a simplified first storage device and to a second non-volatile memory of a second storage device, in accordance with an embodiment of the present application.

FIG. 5A presents a flowchart illustrating a method 500 for facilitating data placement, including a write operation to a first non-volatile memory (persistent write buffer) of a simplified first storage device and to a second non-volatile memory of a second storage device, in accordance with an embodiment of the present application. During operation, the system receives data to be written to persistent media of a first storage device and a second storage device (operation 502). The system determines a current incoming sector of the data to be written (operation 504). The system writes, at approximately the same time, the sector and its corresponding LBA to the first non-volatile memory in a sequential manner, and to the second non-volatile memory at a physical block address determined by the second storage device.

Figure 5B:
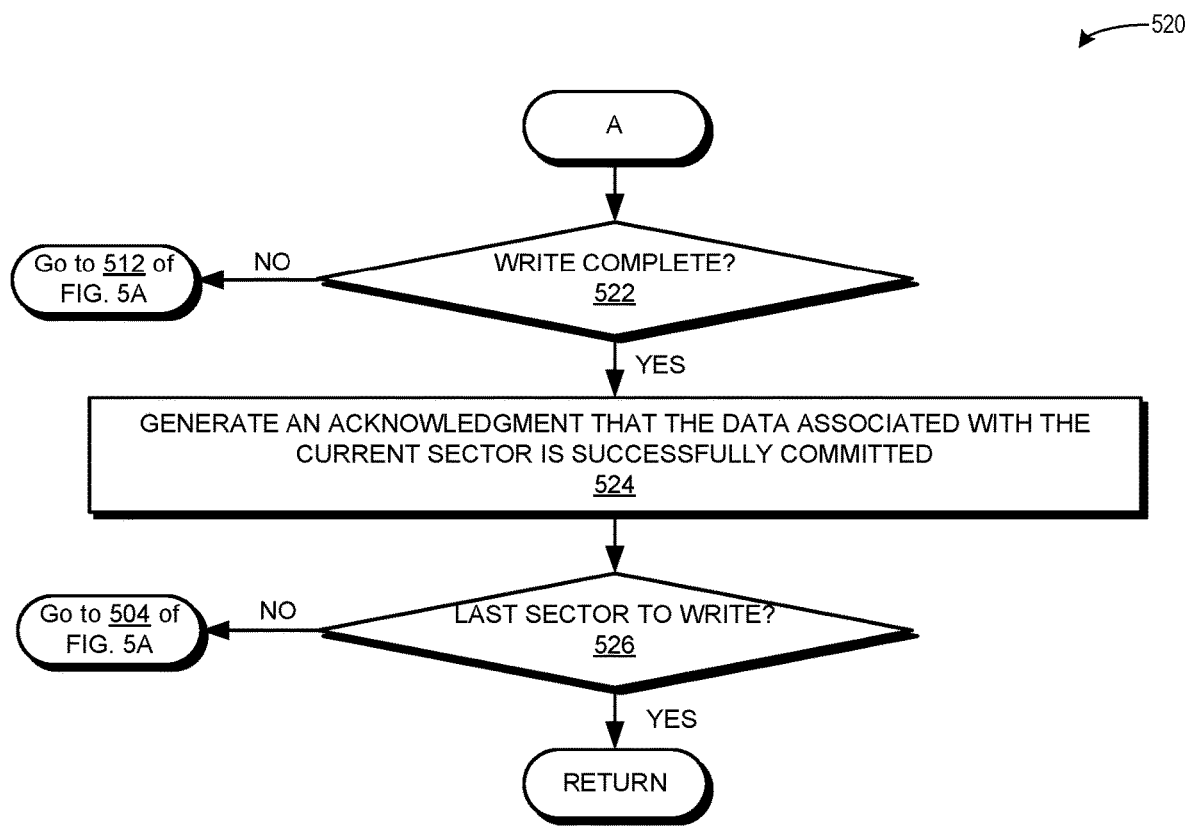
FIG. 5B presents a flowchart illustrating a method for facilitating data placement, including an acknowledgment that the data is successfully committed to a non-volatile memory, in accordance with an embodiment of the present application.
Figure 5C:
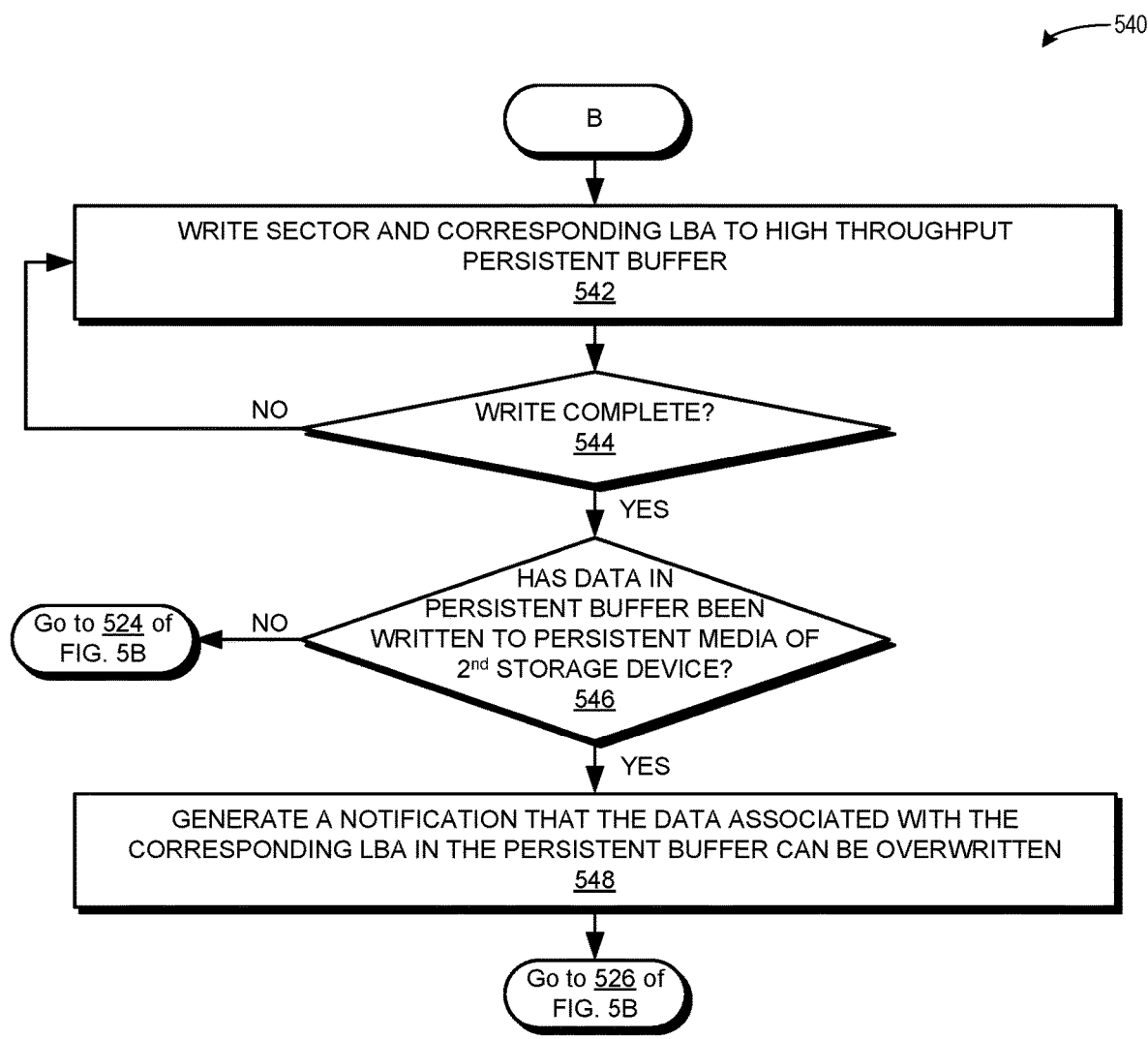
FIG. 5C presents a flowchart illustrating a method for facilitating data placement, including the write operation to the first non-volatile memory (persistent write buffer) of the simplified first storage device, in accordance with an embodiment of the present application.

Specifically, the system writes to the persistent buffer of the first storage device, and the operation continues at Label B of FIG. 5C. The system writes, at approximately the same time, to the second storage device. The system determines if there are sufficient free blocks in the second storage device (decision 506), e.g., determines whether the amount of currently used capacity is less than the nominal capacity. If there are sufficient free blocks (decision 506), the operation continues at operation 512. If there are not sufficient free blocks (decision 506), the system releases redundant blocks from overprovisioning (operation 508), e.g., performs a garbage collection process.

If the capacity of the second storage device is not less than a predetermined watermark (decision 510) (e.g., there is not sufficient space for storing data), the system locks the incoming write to the buffer and releases space as needed (operation 516). For example, the system can set the persistent media or the volatile cache of the second storage device to a read-only mode. The operation continues at decision 510.

If the capacity of the second storage device is less than a predetermined watermark (decision 510) (e.g., if there is still sufficient space for storing data), the system writes the sector and its corresponding LBA to a volatile cache of the second storage device (operation 512), and also writes the sector and its corresponding LBA from the volatile cache to persistent media of the second storage device (operation 514). The second storage device can also generate the physical block address in the persistent media at which to write the sector and its corresponding LBA, and the second storage device, via an FTL module, can store the LBA to PBA mapping (not shown). The operation continues as described at Label A of FIG. 5B.

FIG. 5B presents a flowchart illustrating a method 520 for facilitating data placement, including an acknowledgment that the data is successfully committed to a non-volatile memory, in accordance with an embodiment of the present application. During operation, the system determines whether the incoming write is complete (decision 522). If the write is not complete (decision 522), the operation continues at operation 512 of FIG. 5A. If the write is complete (decision 522), the system generates an acknowledgment that the data associated with the current sector is successfully committed (operation 524). If the current sector is not the last sector to write (decision 526), the operation continues at operation 504 of FIG. 5A. If the current sector is the last sector to write (decision 526), the operation returns.

FIG. 5C presents a flowchart illustrating a method 540 for facilitating data placement, including the write operation to the first non-volatile memory (persistent write buffer) of the simplified first storage device, in accordance with an embodiment of the present application. As described above in relation to FIG. 3, the persistent buffer can accommodate the sequential write of LBA+sector bundles, without maintaining a mapping table. The persistent buffer can perform error recovery related to data stored in the second storage device, based on an LBA associated with erroneous data, by reading out the data stored in the persistent buffer and scanning the read-out data for the associated LBA. This allows the persistent buffer to obtain the associated sector data, and use that obtained sector data as the recovered data for the erroneous data in the second storage device.

During operation, the system writes the sector and its corresponding LBA to the high-throughput persistent buffer (operation 542). The system determines whether the incoming write is complete (decision 544). If the write is not complete (decision 544), the operation continues at operation 542. If the write is complete (decision 544), the system determines whether the data in the persistent buffer has already been written to the persistent media of the second storage device (decision 546). If it has not already been written to the persistent media of the second storage device (decision 546), the operation continues at operation 524 of FIG. 5B (i.e., the system generates an acknowledgment that the data associated with the current sector is successfully committed (operation 524)). Thus, whichever of operations 522 (write complete by second storage device) or operations 544 (write complete by persistent buffer of first storage device) completes first indicates which device generates and sends the acknowledgment to the host. In this manner, only one acknowledgment is sent to the host, and the actual data placement process remains transparent to the host.

If the data in the persistent buffer has already been written to the persistent media of the second storage device (decision 546), the system generates a notification that the data associated with the corresponding LBA in the persistent buffer (of the first storage device) can be overwritten. Thus, if the data has already been written to the persistent media of the second storage device (or placed in the volatile cache of the second storage device), the system can determine that the second storage device has already generated and sent the acknowledgment to the host (operation 524). As a result, the first storage device does not need to generate an acknowledgment of the write commit to the host, and instead, can generate the notification that the corresponding space is available in the persistent buffer. The operation continues at operation 526 of FIG. 5B (i.e., determining whether there are more sectors to write).

Note that prior to operation 542, the system can also check whether there are sufficient free blocks in the persistent buffer (e.g., whether the capacity of the persistent buffer approaches or is less than the nominal capacity), similar to decision 506. If there are not sufficient free blocks (or the persistent buffer is greater than the nominal capacity), the system can release redundant blocks from overprovisioning (e.g., perform a garbage collection process), similar to operation 508. The system can also determine whether the capacity of the persistent buffer is not less than a predetermined watermark, similar to decision 510, and if it is not less than the predetermined watermark, the system can lock the incoming write to the buffer (e.g., set the persistent buffer to a read-only mode) and release space until sufficient space is available, similar to operation 516.

Exemplary Computer System

Figure 6:
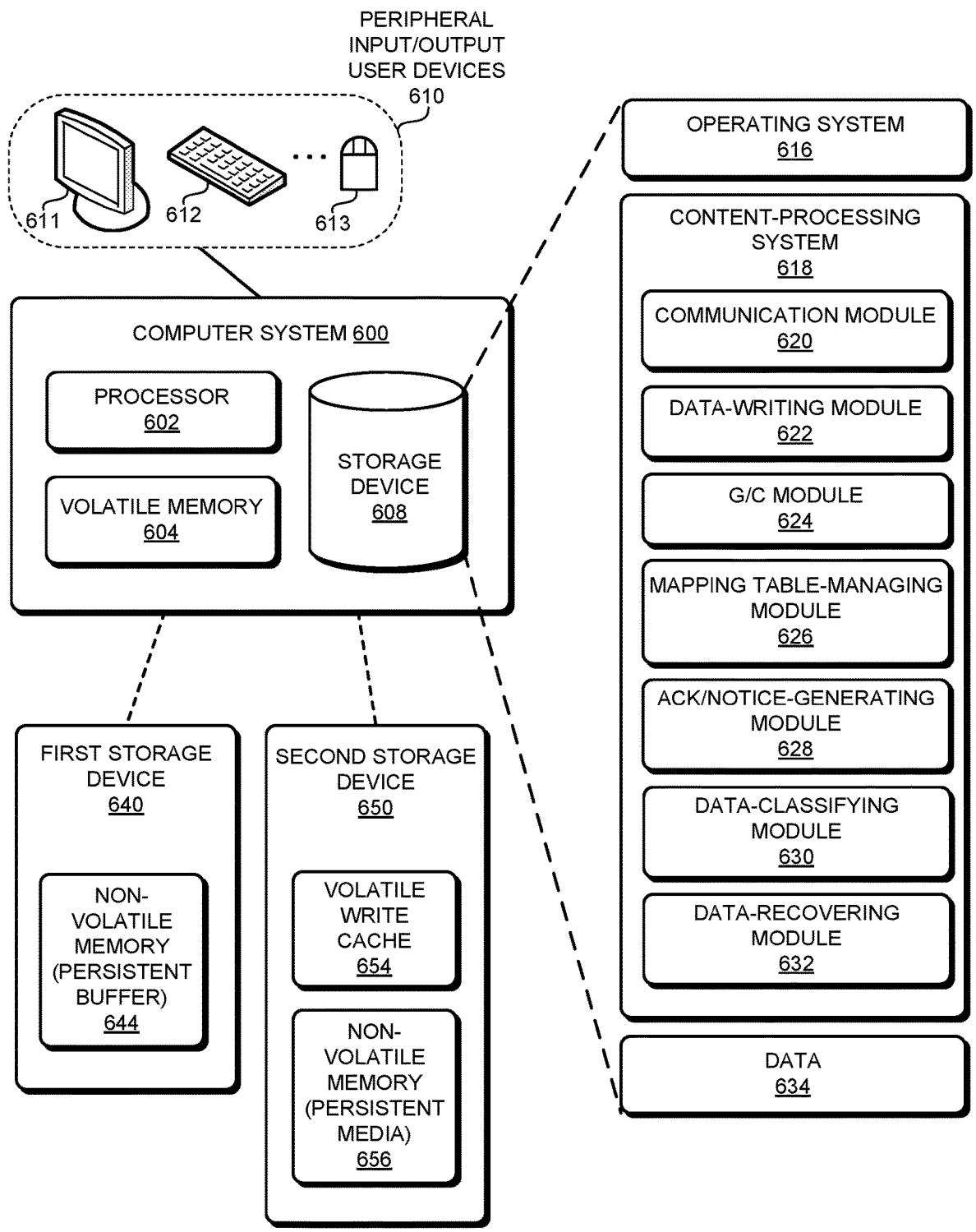
FIG. 6 illustrates an exemplary computer system that facilitates data placement, in accordance with an embodiment of the present application.

FIG. 6 illustrates an exemplary computer system 600 that facilitates data placement, in accordance with an embodiment of the present application. Computer system 600 includes a processor 602, a volatile memory 604, and a storage device 608. Volatile memory 604 can include, e.g., random access memory (RAM), that serves as a managed memory, and can be used to store one or more memory pools. Computer system 600 can be coupled to peripheral input/output (I/O) user devices 610, e.g., a display device 611, a keyboard 612, and a pointing device 614. Storage device 608 can store an operating system 616, a content-processing system 618, and data 634. Computer system 600 can also include or communicate with a first storage device 640 and a second storage device 650, e.g., as part of a distributed storage system. First storage device 640 can include a non-volatile memory (persistent buffer) 644, and second storage device 650 can include a volatile write cache 654 and a non-volatile memory (persistent media) 656.

Content-processing system 618 can include instructions, which when executed by computer system 600, can cause computer system 600 to perform methods and/or processes described in this disclosure. Specifically, content-processing system 618 can include instructions for receiving and transmitting data packets, including data to be read or written, an input/output (I/O) request (e.g., a read request or a write request), a sector, a logical block address, a physical block address, an acknowledgment, and a notification.

Content-processing system 618 can include instructions for receiving a sector of data to be written to a first non-volatile memory and a second non-volatile memory, wherein the first non-volatile memory resides on a first storage device which supports sequential writes without maintaining a mapping table, and wherein the second non-volatile memory resides on a second storage device which includes a volatile cache and maintains a mapping table (communication module 620). Content-processing system 618 can include instructions for writing the sector and its corresponding logical block address to the first non-volatile memory in a sequential manner (data-writing module 622 to buffer 644). Content-processing system 618 can include instructions for writing, at approximately a same time, the sector and its corresponding logical block address to the second non-volatile memory (data-writing module 622 to second storage device 650). Content-processing system 618 can include instructions for, in response to completing the write to the first non-volatile memory or the second non-volatile memory, generating an acknowledgment that the sector is successfully committed for a host from which the sector is received (acknowledgment/notice-generating module 628).

Content-processing system 618 can include instructions for, in response to determining that the sector and its corresponding logical block address have been written to the second non-volatile memory (data-writing module 622), generating a notification that the sector and its corresponding logical block address may be overwritten in the first non-volatile memory (acknowledgment/notice-generating module 628).

Content-processing system 618 can include instructions for, in response to determining an insufficient number of free blocks in the first or the second storage device (garbage collection or "g/c" module 624), releasing redundant blocks to make the redundant blocks available for storing data (garbage collection module 624). Content-processing system 618 can include instructions for, in response to determining that a total capacity of a respective storage device is not less than a predetermined watermark, setting the first or the second non-volatile memory to a read-only mode (data-writing module 622).

Content-processing system 618 can include instructions for determining, by the second storage device, a physical block address of the second non-volatile memory at which to write the sector and its corresponding logical block address (mapping table-managing module 626). Content-processing system 618 can include instructions for storing, by the second storage device in the mapping table, a mapping of the logical block address to the physical block address (mapping table-managing module 626).

Content-processing system 618 can include instructions for accumulating, in the volatile cache, the sector and additional sectors of data to obtain a plurality of sectors (data-classifying module 630). Content-processing system 618 can include instructions for classifying each of the plurality of sectors based on a frequency of access of a respective sector (data-classifying module 630). Content-processing system 618 can include instructions for, in response to detecting an error with a second sector stored in the second non-volatile memory, wherein the second sector is stored with its corresponding second logical block address (data-recovering module 632), performing an error recovery by: reading out all data stored in the first non-volatile memory to obtain a plurality of bundles of data, wherein a respective bundle comprises a logical block address and its corresponding sector of data (data-recovering module 632); scanning the read-out data based on the second logical block address to obtain a bundle which comprises the second sector and its corresponding second logical block address (data-recovering module 632); and using the second sector from the obtained bundle to perform the error recovery of the second sector stored in the second non-volatile memory (data-recovering module 632).

Data 634 can include any data that is required as input or generated as output by the methods and/or processes described in this disclosure. Specifically, data 634 can store at least: data; a sector of data; a corresponding LBA; a PBA; a mapping table; an FTL module; an FTL mapping table; a request; a read request; a write request; an input/output (I/O) request; data associated with a read request, a write request, or an I/O request; a next available physical location; an indicator of a page, a block, or a channel; a notification; an acknowledgment; an indicator of a persistent buffer of a first storage drive; an indicator of a volatile cache or persistent media of a second storage drive; a number; an insufficient number; a redundant block; an overprovisioning strategy; a nominal capacity; a total capacity; a current capacity; a predetermined watermark; an updated sector; an accumulation of sectors; a classification of a data; a frequency of access; a time interval or period; a page of similarly classified data; an indicator of hot, warm, or cold; a condition which triggers a garbage collection; a marked page for recycling; an ascending order of frequency of access; a bundle of data; a bundle including a sector and its corresponding LBA; contents of an entire write cache or persistent buffer; and an error recovery process.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving a sector of data to be written via two separate data paths to a first non-volatile memory and a second non-volatile memory,
   wherein the first non-volatile memory resides on a first storage device which supports sequential writes without maintaining a first mapping table, and wherein the second non-volatile memory resides on a second storage device which maintains a second mapping table;
   responsive to receiving the sector of data, writing the sector and its corresponding logical block address both to the first non-volatile memory in a sequential manner and to the second non-volatile memory; and
   in response to completing the write to the first non-volatile memory or the second non-volatile memory, generating an acknowledgment that the sector is successfully committed for a host from which the sector is received.

2. The method of claim 1, wherein subsequent to completing the write to the first non-volatile memory, the method further comprises:
   in response to determining that the sector and its corresponding logical block address have been written to the second non-volatile memory, generating a notification that the sector and its corresponding logical block address may be overwritten in the first non-volatile memory.

3. The method of claim 1, wherein writing the sector and its corresponding logical block address to the first non-volatile memory comprises:
   writing the sector and its corresponding logical block address to a first block of a plurality of blocks of the first non-volatile memory, via a first channel of a plurality of channels through which to access the blocks, at a next available physical location of the first block.

4. The method of claim 1, wherein prior to writing the sector and its corresponding logical block address to the first or the second non-volatile memory, the method further comprises:
   in response to determining an insufficient number of free blocks in the first or the second storage device, releasing redundant blocks to make the redundant blocks available for storing data;
   in response to determining that a total capacity of a respective storage device is not less than a predetermined watermark, setting the first or the second non-volatile memory to a read-only mode; and
   in response to determining that the total capacity of the respective storage device is less than the predetermined watermark, writing the sector and its corresponding logical block address to the first or the second non-volatile memory.

5. The method of claim 4, further comprising:
   determining, by the second storage device, a physical block address of the second non-volatile memory at which to write the sector and its corresponding logical block address; and
   storing, by the second storage device in a mapping table, a mapping of the logical block address to the physical block address;
   wherein writing the sector and its corresponding logical block address to the second non-volatile memory comprises:
       writing the sector and its corresponding logical block address to a volatile cache of the second storage device; and
       copying the sector and its corresponding logical block address from the volatile cache to the second non-volatile memory at the physical block address.

6. The method of claim 1, wherein the second storage device does not include a power loss protection module, and wherein the method further comprises:
- receiving, by a volatile cache of the second storage device, the sector and its corresponding logical block address;
- writing the sector and its corresponding logical block address to the volatile cache; and
- in response to determining that the sector is an update to data currently stored in the volatile cache, replacing the currently stored data in the volatile cache with the updated sector.

7. The method of claim 1, further comprising:
- accumulating, in a volatile cache of the second storage device, the sector and additional sectors of data to obtain a plurality of sectors;
- classifying each of the plurality of sectors based on a frequency of access of a respective sector; and
- in response to forming a first page of data with sectors of a same classification, writing the first page to a first block of the second non-volatile memory.

8. The method of claim 7, further comprising:
- in response to detecting a condition which triggers a garbage collection, performing the garbage collection on the first page; and
- marking the first page as available for storing data.

9. The method of claim 7, wherein a classification for a respective sector, in an ascending order of frequency of access, comprises one or more of hot, warm, and cold.

10. The method of claim 1, further comprising:
- in response to detecting an error with a second sector stored in the second non-volatile memory, wherein the second sector is stored with its corresponding second logical block address, performing an error recovery by:
  - reading out all data stored in the first non-volatile memory to obtain a plurality of bundles of data, wherein a respective bundle comprises a logical block address and its corresponding sector of data;
  - scanning the read-out data based on the second logical block address to obtain a bundle which comprises the second sector and its corresponding second logical block address; and
  - using the second sector from the obtained bundle to perform the error recovery of the second sector stored in the second non-volatile memory.

11. A computer system, comprising:
- a processor; and
- a memory coupled to the processor and storing instructions, which when executed by the processor cause the processor to perform a method, the method comprising:
- receiving a sector of data to be written via two separate data paths to a first non-volatile memory and a second non-volatile memory,
- wherein the first non-volatile memory resides on a first storage device which supports sequential writes without maintaining a first mapping table, and wherein the second non-volatile memory resides on a second storage device which maintains a second mapping table;
- responsive to receiving the sector of data, writing the sector and its corresponding logical block address both to the first non-volatile memory in a sequential manner and to the second non-volatile memory; and
- in response to completing the write to the first non-volatile memory or the second non-volatile memory, generating an acknowledgment that the sector is successfully committed for a host from which the sector is received.

12. The computer system of claim 11, wherein subsequent to completing the write to the first non-volatile memory, the method further comprises:
- in response to determining that the sector and its corresponding logical block address have been written to the second non-volatile memory, generating a notification that the sector and its corresponding logical block address may be overwritten in the first non-volatile memory.

13. The computer system of claim 11, wherein writing the sector and its corresponding logical block address to the first non-volatile memory comprises:
- writing the sector and its corresponding logical block address to a first block of a plurality of blocks of the first non-volatile memory, via a first channel of a plurality of channels through which to access the blocks, at a next available physical location of the first block.

14. The computer system of claim 11, wherein prior to writing the sector and its corresponding logical block address to the first or the second non-volatile memory, the method further comprises:
- in response to determining an insufficient number of free blocks in the first or the second storage device, releasing redundant blocks to make the redundant blocks available for storing data;
- in response to determining that a total capacity of a respective storage device is not less than a predetermined watermark, setting the first or the second non-volatile memory to a read-only mode; and
- in response to determining that the total capacity of the respective storage device is less than the predetermined watermark, writing the sector and its corresponding logical block address to the first or the second non-volatile memory.

15. The computer system of claim 14, wherein the method further comprises:
- determining, by the second storage device, a physical block address of the second non-volatile memory at which to write the sector and its corresponding logical block address; and
- storing, by the second storage device in the mapping table, a mapping of the logical block address to the physical block address;
- wherein writing the sector and its corresponding logical block address to the second non-volatile memory comprises:
  - writing the sector and its corresponding logical block address to a volatile cache of the second storage device; and
  - copying the sector and its corresponding logical block address from the volatile cache to the second non-volatile memory at the physical block address.

16. The computer system of claim 11, wherein the second storage device does not include a power loss protection module, and wherein the method further comprises:
- receiving, by a volatile cache of the second storage device, the sector and its corresponding logical block address;
- writing the sector and its corresponding logical block address to the volatile cache; and
- in response to determining that the sector is an update to data currently stored in the volatile cache, replacing the currently stored data in the volatile cache with the updated sector.

17. The computer system of claim 11, wherein the method further comprises:

accumulating, in a volatile cache of the second storage device, the sector and additional sectors of data to obtain a plurality of sectors;

classifying each of the plurality of sectors based on a frequency of access of a respective sector; and in response to forming a first page of data with sectors of a same classification, writing the first page to a first block of the second non-volatile memory.

18. The computer system of claim 17, wherein the method further comprises:

in response to detecting a condition which triggers a garbage collection, performing the garbage collection on the first page; and marking the first page as available for storing data, wherein a classification for a respective sector, in an ascending order of frequency of access, comprises one or more of hot, warm, and cold.

19. The computer system of claim 11, wherein the method further comprises:

in response to detecting an error with a second sector stored in the second non-volatile memory, wherein the second sector is stored with its corresponding second logical block address, performing an error recovery by:

reading out all data stored in the first non-volatile memory to obtain a plurality of bundles of data, wherein a respective bundle comprises a logical block address and its corresponding sector of data;

scanning the read-out data based on the second logical block address to obtain a bundle which comprises the second sector and its corresponding second logical block address; and using the second sector from the obtained bundle to perform the error recovery of the second sector stored in the second non-volatile memory.

20. An apparatus, comprising:

a first storage device with a first non-volatile memory, wherein the first storage device supports sequential writes without maintaining a first mapping table; and a second storage device with a second non-volatile memory, wherein the second storage device maintains a second mapping table;

wherein the apparatus is configured to receive a sector of data to be written via two separate data paths to the first non-volatile memory and the second non-volatile memory;

wherein responsive to the apparatus receiving the sector of data, the first storage device is configured to write the sector and its corresponding logical block address to the first non-volatile memory in a sequential manner and the second storage device is configured to write the sector and its corresponding logical block address to the second non-volatile memory; and wherein in response to completing the write to the first non-volatile memory or the second non-volatile memory, the apparatus is configured to generate an acknowledgment that the sector is successfully committed for a host from which the sector is received.

* * * * *